(12) United States Patent
Ide

(10) Patent No.: US 12,298,507 B2
(45) Date of Patent: May 13, 2025

(54) DISPLAY DEVICE AND OPTICAL UNIT

(71) Applicant: SEIKO EPSON CORPORATION, Tokyo (JP)

(72) Inventor: Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 754 days.

(21) Appl. No.: 17/537,368

(22) Filed: Nov. 29, 2021

(65) Prior Publication Data

US 2022/0171196 A1    Jun. 2, 2022

(30) Foreign Application Priority Data

Nov. 30, 2020  (JP) ................................ 2020-198038

(51) Int. Cl.
*G02B 27/01*        (2006.01)
(52) U.S. Cl.
CPC .... *G02B 27/0172* (2013.01); *G02B 2027/011* (2013.01); *G02B 2027/0145* (2013.01); *G02B 2027/0178* (2013.01)

(58) Field of Classification Search
CPC .......... G02B 27/0172; G02B 2027/011; G02B 2027/0145; G02B 2027/0178
See application file for complete search history.

(56) References Cited

U.S. PATENT DOCUMENTS

| 5,687,025 | A | 11/1997 | Nanba |
| 2018/0143427 | A1 | 5/2018 | Griffin et al. |
| 2020/0033607 | A1 | 1/2020 | Takeda |

FOREIGN PATENT DOCUMENTS

| CN | 110780444 | 2/2020 |
| JP | H0943536 | 2/1997 |

*Primary Examiner* — Wen Huang
(74) *Attorney, Agent, or Firm* — JCIPRNET

(57) ABSTRACT

A display device includes a projection lens that transmits an image light, a prism mirror that receives the image light emitted from the projection lens through a light incident surface, reflects the image light with an inner reflection surface, and emits the image light from a light emission surface, and a see-through mirror that reflects a part of the image light emitted from the prism mirror toward a pupil position, wherein an intermediate image is formed between the inner reflection surface and the see-through mirror, and the light emission surface has a first region and a second region that is higher a refractive power than the first region.

10 Claims, 13 Drawing Sheets

DISPLAY DEVICE AND OPTICAL UNIT

The present application is based on, and claims priority from JP Application Serial Number 2020-198038, filed Nov. 30, 2020, the disclosure of which is hereby incorporated by reference herein in its entirety.

BACKGROUND

1. Technical Field

The present disclosure relates to a see-through type display device and an optical unit that enable observation of a virtual image, and particularly relates to a display device and an optical unit of a type in which image light is caused to be incident on a see-through mirror and reflected light from the see-through mirror is observed.

2. Related Art

As a see-through type display device, there is one in which a zigzag optical path is formed by two obliquely incident mirrors, and image light from a display element is incident on the eyes of a user via the zigzag optical path (refer to JP-A-09-43536).

In such a see-through type display device such as in JP-A-09-43536, because it is necessary to secure a large region in which an external scene is visible, the arrangement of optical components is limited, distortion tends to increase, and imaging performance tends to deteriorate.

SUMMARY

A display device according to one aspect of the present disclosure includes an image element that emits an image light, a projection lens that transmits the image light from the image element, a prism that includes: a light incident surface in which the image light from the projection lens is incident, a light emission surface emitting the image light, and a reflecting surface reflecting the image light from the light incident surface toward the light emission surface, and a mirror that reflects a part of the image light from the prism mirror toward a pupil position and that transmits other part of the image light, wherein an intermediate image is formed between the reflection surface and the mirror, and the light emission surface has a first region and a second region that is higher refractive a power than the first region.

BRIEF DESCRIPTION OF THE DRAWINGS

FIG. 4 is a partial enlarged cross-sectional view showing a light emission surface of a prism mirror, and the like.

DESCRIPTION OF EXEMPLARY EMBODIMENTS

First Embodiment

Hereinafter, a display device of a first embodiment according to the present disclosure and an optical unit incorporated therein will be described with reference to FIGS. 1 to 3 and the like.

Figure 1:
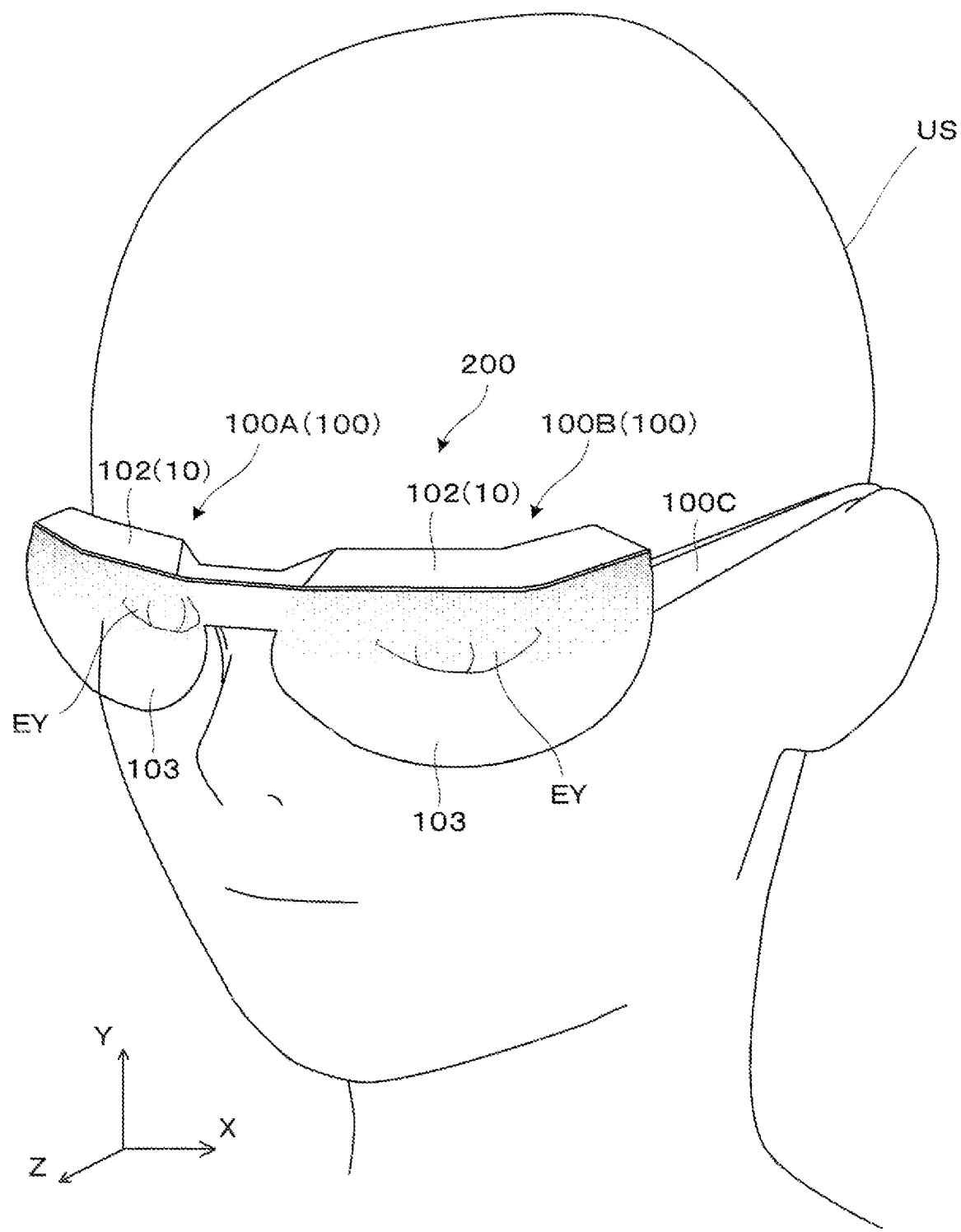
FIG. 1 is an external perspective view showing a mounted state of a display device according to a first embodiment.

FIG. 1 is a diagram showing a mounted state of a head-mounted display (hereinafter, also referred to as "HMD") 200, and the HMD 200 allows an observer or wearer US who is wearing the HMD 200 to be able to recognize an image as a virtual image. In FIG. 1 and the like, X, Y, and Z are an orthogonal coordinate system, a +X direction corresponds to a transverse direction in which the two eyes EY of an observer or wearer US who is wearing the HMD 200 or a display device 100 are disposed, a +Y direction corresponds to an upward direction orthogonal to the transverse direction in which the two eyes EY of the wearer US are disposed, and a +Z direction corresponds to a direction to the front or a forward direction for the wearer US. A ±Y direction is parallel to a vertical axis or a vertical direction.

The HMD 200 includes a first display device 100A for the right eye, a second display device 100B for the left eye, and a pair of temple type support devices 100C that support the display devices 100A and 100B. The first display device 100A includes a display drive part 102 disposed at an upper portion thereof, and an exterior member 103 that has a spectacle lens shape and covers the front of the eye. Similarly, the second display device 100B is constituted of a display drive part 102 disposed at an upper portion thereof, and an exterior member 103 that has a spectacle lens shape and covers the front of the eye. The support device 100C supports the upper end side of the exterior member 103 via the display drive part 102. The first display device 100A and the second display device 100B are optically inverted left and right, and hereinafter, the first display device 100A for the right eye will be described as a representative display device 100.

Figure 2:
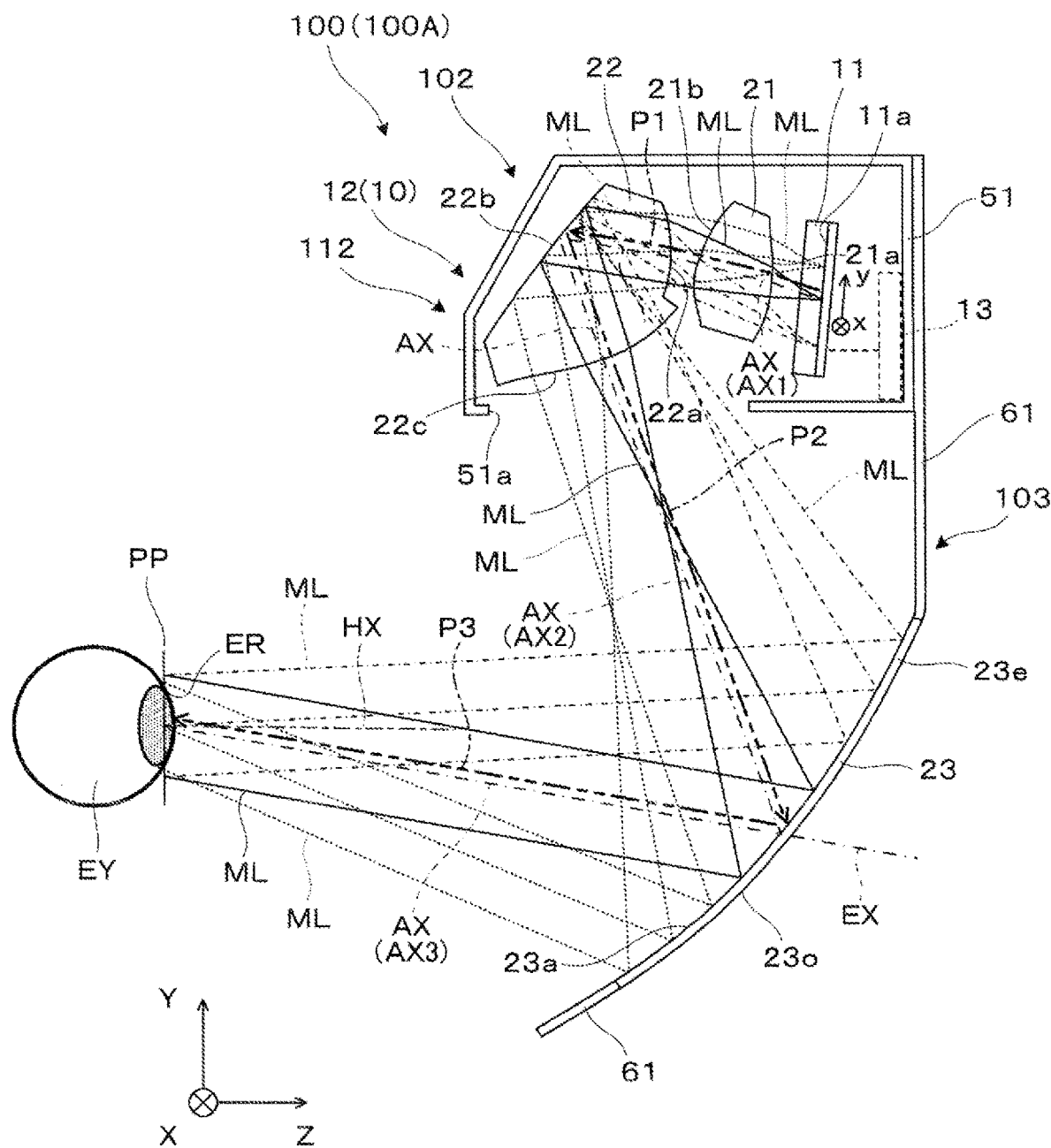
FIG. 2 is a side cross-sectional view showing an internal structure of the display device.

FIG. 2 is a side cross-sectional view showing an optical structure of the display device 100. As shown, the display device 100 includes an image element 11, an imaging optical system 12, and a display control circuit 13. However, in the specification, a device excluding the display control circuit 13 is also referred to as a display device 100 from the viewpoint of achieving an optical function. The image element 11 and the display control circuit 13 are supported in a case 51 that is an outer frame of the display drive part 102 shown in FIG. 1, and a part of the imaging optical system 12 is also supported in the case 51 of the display drive part 102.

The image element 11 is a spontaneous light emission type display device. The image element 11 is, for example, an organic electroluminescence (EL) display, and forms a color still image or moving image on a two-dimensional display surface 11a. The image element 11 is disposed along an x-y plane that is inclined by being slightly rotated about the X axis with respect to an X-Y plane. The image element 11 is driven by the display control circuit 13 to perform a display operation. The image element 11 is not limited to an organic EL display, and can be replaced with a micro LED display or a display device using inorganic EL, an organic LED, a laser array, a quantum dot light emission element, or the like. The image element 11 is not limited to the spontaneous light emission type image light generation device, may include an LCD or another light modulation element, and may form an image by illuminating the light modulation element with a light source such as a backlight. As the image element 11, a liquid crystal on silicon (LCOS) (LCoS is a registered trademark), a digital micro-mirror device, or the like may be used instead of the LCD.

The imaging optical system 12 includes a projection lens 21, a prism mirror 22, and a see-through mirror 23 as an optical unit 10. In the present embodiment, an optical path from the image element 11 to the prism mirror 22 is disposed above an upper end 23e of the see-through mirror 23. More specifically, the image element 11, the projection lens 21, and the prism mirror 22 are disposed above the upper end 23e of the see-through mirror 23. However, the projection lens 21, the prism mirror 22, and the like may be disposed at positions which are partially lower than the upper end 23e of the see-through mirror 23 in the range in which an optical path of an image light ML incident on the eye EY is not obstructed. That is, the projection lens 21, the prism mirror 22, and the like may be disposed at positions which are partially lower than the upper end 23e of the see-through mirror 23 in the range in which the optical path of the image light ML incident on the eye EY is not obstructed.

The projection lens 21 causes the image light ML emitted from the image element 11 to pass therethrough and then to be incident on the prism mirror 22. The projection lens 21 focuses the image light ML emitted from the image element 11 into a state close to a parallel luminous flux. The projection lens 21 is a single lens, and has an incident surface 21a and an emission surface 21b. The prism mirror 22 has a light incident surface 22a, an inner reflection surface 22b, and a light emission surface 22c, and causes the image light ML emitted from the projection lens 21 to be incident on the light incident surface 22a, to be totally reflected by the inner reflection surface 22b, and to be emitted from the light emission surface 22c. At this time, the prism mirror 22 emits the image light ML incident from the front such that it is bent in a direction inclined with respect to a direction in which an incident direction is reversed (a direction of the light source seen from the prism mirror 22). In the case of an optical system that is eccentric in a up-down direction as in the present embodiment, in front of the optical path includes that within a range of about 45° up and down with respect to the +Z direction, and a direction inclined with respect to the front (that is, the direction in which the incident direction is reversed) includes that within a range of about 45° up and down with respect to an intermediate direction formed at 45° with respect to the +Z direction and the −Y direction. The see-through mirror 23 reflects the image light ML emitted from the prism mirror 22 toward a pupil position PP. The pupil position PP is a position at which the image light ML from each of points on the display surface 11a is incident to overlap from an angular direction corresponding to a position of each of points on the display surface 11a in a predetermined divergent state or a parallel state.

The projection lens 21 and the prism mirror 22 are accommodated in the case 51 together with the image element 11. The case 51 is formed of a light shielding material and supports the display control circuit 13 that operates the image element 11. The case 51 is formed of a metal material or a resin material. In the case of a resin material, a black light-shielding material may be applied to the inner surface side thereof. The case 51 supports the image element 11, the projection lens 21, and the prism mirror 22 via a holding member or lens barrel (not shown) formed of a light-shielding material. The case 51 has an opening 51a and allows the display drive part 102 to emit the image light ML toward the outside. The image light ML emitted outside the display drive part 102 is incident on the inside of the see-through mirror 23.

In the shown example, the display control circuit 13 is disposed in the case 51, but the display control circuit 13 may be disposed outside the case 51. The image element 11 does not need to be disposed in the case 51 either, and an opening for the image element 11 may be provided in the case 51, and the image element 11 may be fixed to an outer portion of the case 51 so that the display surface 11a faces the inside of the case 51 via the opening.

The case 51 supports the see-through mirror 23 via a support plate 61. In this case, the see-through mirror 23 is stably supported with respect to the prism mirror 22 or the like via the case 51. The see-through mirror 23 and the support plate 61 correspond to the exterior member 103 shown in FIG. 1.

The imaging optical system 12 is an off-axis optical system 112 due to the see-through mirror 23 being a concave mirror. In the case of the present embodiment, the projection lens 21, the prism mirror 22, and the see-through mirror 23 are disposed to be non-axially symmetrical and have an optical surface that is non-axisymmetric. The fact that the imaging optical system 12 is an off-axis optical system 112 means that the overall optical path is bent with respect to before and after light rays are incident on a plurality of reflection surfaces or refraction surfaces in the optical elements 21, 22, and 23 constituting the imaging optical system 12. In this imaging optical system 12, that is, the off-axis optical system 112, an optical axis AX is bent so that the optical axis AX extends along an off-axis surface (a surface parallel to a Y-Z plane) corresponding to a plane of the drawing. In this imaging optical system 12, the optical elements 21, 22, and 23 are arranged along the off-axis surface by bending the optical axis AX in the off-axis surface parallel to the Y-Z plane. The imaging optical system 12 includes optical axis portions AX1, AX2, and AX3 that are disposed along the off-axis surface (a surface parallel to the Y-Z plane) which is a reference surface extending in the up-down direction and are inclined with respect to each other before and after the reflection surface. The optical axis AX as a whole extends along an optical path of a main ray emitted from the center of the image element 11 and passes through the center of the eye ring ER or the pupil corresponding to an eye point. The optical axis AX is disposed in a Z shape by the plurality of optical axis portions AX1, AX2, and AX3 when seen in a transverse cross section parallel to the Y-Z plane. In other words, in the off-axis surface parallel to the Y-Z plane, an optical path P1 from the projection lens 21 to an inner reflection surface 22b, an optical path P2 from the inner reflection surface 22b to the see-through mirror 23, and an optical path P3 from the see-through mirror 23 to the pupil position PP are bent in a Z shape in two stages. The imaging optical system 12 is arranged vertically. The off-axis surface (the surface parallel to the Y-Z plane) which is a reference surface extends parallel to the Y direction which is a up-down direction. In this case, the optical elements 21, 22, and 23 constituting the display device 100 are arranged so that height positions thereof are changed in the up-down direction, and an increase in a transverse width of the display device 100 can be prevented.

In the imaging optical system 12, the optical path P1 from the projection lens 21 to the inner reflection surface 22b is in a state nearly parallel to the Z direction. That is, in the optical path P1, the optical axis portion AX1 extends substantially parallel to the Z direction or a forward direction. As a result, the projection lens 21 is disposed between the prism mirror 22 and the image element 11 in the Z direction or the forward direction. The optical axis portion AX1 in the optical path P1 is preferably kept within a range of approximately −30° to +30° in the Z direction with a downward direction being negative. It is possible to avoid interference of the projection lens 21 and the image element 11 with the see-through mirror 23 by setting the optical axis portion AX1 of the optical path P1 to be −30° or more downward in the Z direction. In addition, it is possible to prevent the projection lens 21 and the image element 11 from protruding upward and becoming visually noticeable by setting the optical axis portion AX1 of the optical path P1 to be +30° or less upward in the Z direction. In the optical path P2 from the inner reflection surface 22b to the see-through mirror 23, the optical axis portion AX2 is preferably kept within a range of an approximately −70° to −45° on average in the Z direction with the downward direction being negative. It is possible to avoid an excessive increase in the overall inclination of the see-through mirror 23 and to easily secure a space in which an inner lens is disposed inside the see-through mirror 23 by setting the optical axis portion AX2 of the optical path P2 to be −70° or more downward in the Z direction. In addition, it is possible to avoid arrangement of the prism mirror 22 such that it protrudes greatly in the −Z direction or a backward direction with respect to the see-through mirror 23 and to avoid an increase in a thickness of the imaging optical system 12 by setting the optical axis AX of the optical path P2 to be −45° or less downward in the Z direction. The optical path P3 from the see-through mirror 23 to the pupil position PP is in a state of being nearly parallel to the Z direction, but in the shown example, the optical axis portion AX3 is approximately −10° in the Z direction with the downward direction being negative. That is, an emission optical axis EX which is an extension of the optical axis portion AX3 is inclined downward by approximately 10° with respect to the +Z direction on the front side and extends. This is because a line of sight of a human being is stable in a slightly lowered eye state in which the line of sight is inclined downward by approximately 10° with respect to a horizontal direction. A central axis HX that extends in the horizontal direction with respect to the pupil position PP assumes a case in which the wearer US wearing the display device 100 relaxes in an upright posture and faces the front and gazes at the horizontal direction or the horizontal line. Although a shape and posture of the head including the arrangement of the eyes and the arrangement of the ears, and the like of the individual wearer US wearing the display device 100 are various, the average central axis HX can be set for the display device 100 of interest by assuming the average head shape or head position of the wearer US. As a result of the above, in the inner reflection surface 22b of the prism mirror 22, a reflection angle of the light rays along the optical axis AX is approximately 10° to 60°. Further, in the see-through mirror 23, the reflection angle of the light rays along the optical axis AX is approximately 20° to 45°.

The details of the imaging optical system 12 will be described with reference to FIG. 3. In FIG. 3, a region AR1 shows a side cross-sectional view of the imaging optical system 12, and a region AR2 is a conceptual diagram for showing a structure of the imaging optical system 12 in a plan view.

The incident surface 21a and the emission surface 21b which are the optical surfaces constituting the projection lens 21 have asymmetry with respect to up-down first directions D11 and D12 parallel to the Y-Z plane and intersecting the optical axis AX with the optical axis AX interposed therebetween, and have symmetry with respect to a transverse second direction D02 or the X direction orthogonal to the first directions D11 and D12 with the optical axis AX interposed therebetween. The up-down first direction D11 with respect to the incident surface 21a and the up-down second direction D12 with respect to the emission surface 21b form a predetermined angle.

The projection lens 21 may be formed of, for example, a resin, but may also be formed of glass. The incident surface 21a and the emission surface 21b of the projection lens 21 are freely-curved surfaces, for example. The incident surface 21a and the emission surface 21b are not limited to freely-curved surfaces, and may be aspherical surfaces. In the projection lens 21, an aberration reduction can be achieved by setting the incident surface 21a and the emission surface 21b to be freely-curved surfaces or aspherical surfaces, and, particularly when a freely-curved surface is used, and because the optical performance of an eccentric system is easily improved, an aberration of the imaging optical system 12 which is a non-coaxial off-axis optical system 112 can be easily reduced. The freely-curved surface is a surface without an axis of rotational symmetry, and various polynomials may be used as a surface function of the freely-curved surface. In addition, the aspherical surface is a surface having an axis of rotational symmetry and represented by a polynomial, but is a paraboloid or a surface other than a spherical surface. Although detailed illustration is omitted, an antireflection film is formed at the incident surface 21a and the emission surface 21b.

The prism mirror 22 is a refractive reflection optical member having a function of combining a mirror and a lens, and reflects the image light ML from the projection lens 21 while refracting it. More specifically, in the prism mirror 22, the image light ML is incident on the inside via the light incident surface 22a which is the refraction surface, is totally reflected in a non-forward direction by the inner reflection surface 22b which is the reflection surface, and is emitted to the outside via the light emission surface 22c which is the refraction surface. The light incident surface 22a and the light emission surface 22c are optical surfaces formed of curved surfaces, and contribute to resolution improvement compared to a case in which they are only the reflection surfaces or they are flat surfaces. The light incident surface 22a, the inner reflection surface 22b, and the light emission surface 22c which are the optical surfaces constituting the prism mirror 22 have asymmetry with respect to the up-down first directions D21, D22, and D23 parallel to the Y-Z plane and intersecting the optical axis AX with the optical axis AX interposed therebetween, and have symmetry with respect to the transverse second direction D02 or the X direction orthogonal to the first directions D21, D22, and D23 with the optical axis AX interposed therebetween.

The prism mirror 22 may be formed of, for example, a resin, but may also be formed of glass. A refractive index of a main body of the prism mirror 22 is set to a value such that total reflection on the inner surface is achieved in consideration of a reflection angle of the image light ML. A refractive index and an Abbe number of the main body of the prism mirror 22 are preferably set in consideration of a relationship with the projection lens 21. In particular, color dispersion remaining as a whole is reduced by increasing the Abbe number of the prism mirror 22 and the projection lens 21.

The optical surface of the prism mirror 22, that is, the light incident surface 22a, the inner reflection surface 22b, and the light emission surface 22c are, for example, freely-curved surfaces. The light incident surface 22a, the inner reflection surface 22b, and the light emission surface 22c are not limited to freely-curved surfaces, and may be aspherical surfaces. In the prism mirror 22, the aberration reduction can be achieved by setting the optical surfaces 22a, 22b, and 22c to be freely-curved surfaces or aspherical surfaces, and, in particular, when a freely-curved surface is used, the optical performance of the eccentric system is easily improved. That is, the aberration of the imaging optical system 12 which is the non-coaxial off-axis optical system 112 is easily reduced, and the resolution can be improved. The inner reflection surface 22b is not limited to one that reflects the image light ML by total reflection, and may be a reflection surface formed of a metal film or a dielectric multilayer film. In this case, a reflection film formed of a single layer film or multilayer film formed of a metal such as Al or Ag is formed at the inner reflection surface 22b by vapor deposition or the like, or a sheet-shaped reflection film formed of a metal is affixed thereto. Although detailed illustration is omitted, an antireflection film is formed at the light incident surface 22a and the light emission surface 22c.

A width w2 of the prism mirror 22 in the transverse direction, that is, a ±X direction perpendicular to the off-axis surface (the surface parallel to the Y-Z plane) which is a reference surface is greater than a width w1 in the forward to rearward ±Z direction parallel to the off-axis surface which is the reference surface. In this case, a wide angle of view in the transverse direction can be ensured. The width w2 of the prism mirror 22 in the transverse direction, that is, the ±X direction is greater than a width w3 in a vertical direction, that is, the ±Y direction parallel to the off-axis surface. Here, the widths w1, w2, and w3 may be actual contours, and may also be based on effective regions of the optical surfaces 22a, 22b, and 22c.

The see-through mirror 23 is a curved plate-shaped optical member that serves as a concave surface mirror, and reflects the image light ML from the prism mirror 22. That is, the see-through mirror 23 reflects the image light ML from an emission region of the display drive part 102 toward the pupil position PP. The see-through mirror 23 covers the pupil position PP at which the eye EY or the pupil is disposed, has a concave shape toward the pupil position PP, and has a convex shape toward the outside. The see-through mirror 23 is a concave transmission mirror that covers the entire effective region of a screen in the view. The see-through mirror 23 is a collimator having a convergence function, and converges the main rays of the image light ML temporarily spread by imaging in the vicinity of the emission region of the display drive part 102, which are the main rays of the image light ML emitted from each of points on the display surface 11a, at the pupil position PP. The see-through mirror 23 is a mirror plate having a structure in which a mirror film 23c is formed at a front surface or a back surface of a plate-shaped body 23b. The reflection surface 23a of the see-through mirror 23 has transmissive properties. The see-through mirror 23 and the reflection surface 23a have asymmetry with respect to the up-down first direction D31 parallel to the Y-Z plane and intersecting the optical axis AX with the optical axis AX interposed therebetween, and have symmetry with respect to the transverse second direction D02 or the X direction orthogonal to the first direction D31 with the optical axis AX interposed therebetween.

The reflection surface 23a of the see-through mirror 23 is, for example, a freely-curved surface. The reflection surface 23a is not limited to a freely-curved surface, and may be an aspherical surface. The aberration reduction can be achieved by setting the see-through mirror 23 to be a freely-curved surface or an aspherical surface, and, in particular, when a freely-curved surface is used, the aberration of the imaging optical system 12 which is an off-axis optical system or a non-coaxial optical system can be easily reduced. The see-through mirror 23 has a shape in which the origin of a curved surface expression is shifted toward the projection lens 21 side or the image element 11 side from the effective region of the see-through mirror 23, even when the reflection surface 23a is any one of a freely-curved surface and an aspherical surface. In this case, an inclined surface of the see-through mirror 23 that realizes a Z shaped optical path without imposing an excessive burden on the design of the optical system can be set.

The see-through mirror 23 is a transmissive type reflection element that allows transmission of some of light upon reflection, and the reflection surface 23a or the mirror film 23c of the see-through mirror 23 is formed by a reflection layer having a semi-transmissive property. Thus, because outside light OL passes through the see-through mirror 23, see-through view of the outside is enabled, and a virtual image can be superimposed on an outside image. At this time, when the plate-shaped body 23b that supports the mirror film 23c has a thickness of less than or equal to approximately a few millimeters, a change in magnification of the outside image can be reduced to being small. A reflectance of the mirror film 23c with respect to the image light ML and the outside light OL is set to 10% or more and 50% or less in a range of an incident angle of the assumed image light ML from the viewpoint of ensuring a brightness of the image light ML and facilitating observation of the outside image by see-through. The plate-shaped body 23b which is a base material of the see-through mirror 23 is formed of, for example, a resin, and may also be formed of glass. The plate-shaped body 23b is formed of the same material as the support plate 61 that supports the plate-shaped body 23b from the surrounding thereof, and has the same thickness as the support plate 61. The mirror film 23c is formed of, for example, a dielectric multilayer film configured of a plurality of dielectric layers having an adjusted film thickness. The mirror film 23c may be a single-layer film or a multilayer film of a metal such as Al or Ag of which a film thickness has been adjusted. The mirror film 23c may be formed by laminating, and may also be formed by affixing a sheet-shaped reflection film. An antireflection film is formed at an outer surface 23o of the plate-shaped body 23b.

In describing the optical path, the image light ML from the image element 11 is emitted in a state in which it is incident on the projection lens 21 and is substantially collimated. The image light ML that has passed through the projection lens 21 is incident on the prism mirror 22, passes through the light incident surface 22a while being refracted by it, is reflected by the inner reflection surface 22b with a high reflectance close to 100%, and is refracted again by the light emission surface 22c. The image light ML from the prism mirror 22 is incident on the see-through mirror 23 and is reflected by the reflection surface 23a with a reflectance of about 50% or less. The image light ML reflected by the see-through mirror 23 is incident on the pupil position PP at which the eye EY or pupil of the wearer US is placed. The outside light OL that has passed through the see-through mirror 23 and the support plate 61 therearound is also incident on the pupil position PP. In other words, the wearer US wearing the display device 100 can observe a virtual image of the image light ML in a state in which it overlaps the outside image.

Figure 3:
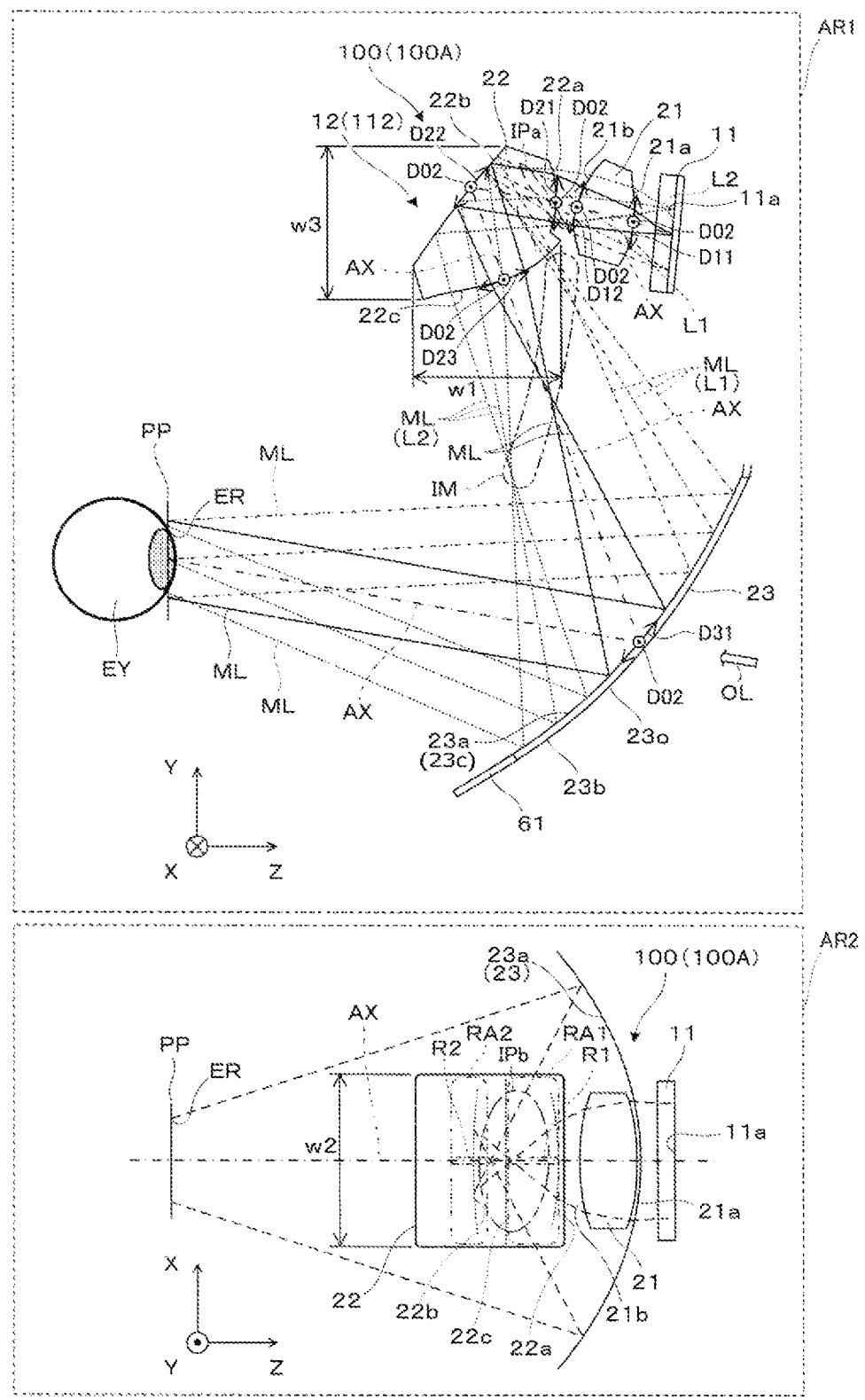
FIG. 3 shows a side cross-sectional view and a plane structural view of the display device.

In this imaging optical system 12, an intermediate pupil IPa in the up-down direction is disposed near the light incident surface 22a of the prism mirror 22 (refer to the region AR1 in FIG. 3). The intermediate pupil IPa in the up-down direction means a place at which the image light ML from each of points on a up-down line segment extending in the ±y direction from the center of the display surface 11a of the image element 11 spreads longitudinally, and an amount of mutual overlapping thereof is large. An intermediate pupil IPb in the up-down direction is disposed inside the prism mirror 22 (refer to region AR2 in FIG. 3). The intermediate pupil IPb in the transverse direction means a place at which the image light ML from each of points on a transverse line segment extending in the ±x direction from the center of the display surface 11a of the image element 11 spreads transversely, and an amount of mutual overlapping thereof is large. The intermediate pupils IPa and IPb are located at a conjugate point of the eye ring ER or pupil position PP.

An intermediate image IM is formed between the prism mirror 22 and the see-through mirror 23. The intermediate image IM is formed closer to the prism mirror 22 than to the see-through mirror 23. In this way, the burden of enlargement by the see-through mirror 23 can be reduced, and thus the aberration of the observed virtual image can be curbed by forming the intermediate image IM closer to the prism mirror 22 than to the see-through mirror 23. The intermediate image IM is a real image formed at a conjugate position with respect to the display surface 11a, which is located upstream from the eye ring ER in the optical path, and has a pattern corresponding to a display image on the display surface 11a, but it does not need to be a sharply imaged one, and may be one which exhibits various aberrations such as curvature of an image surface and distortion.

Figure 4:
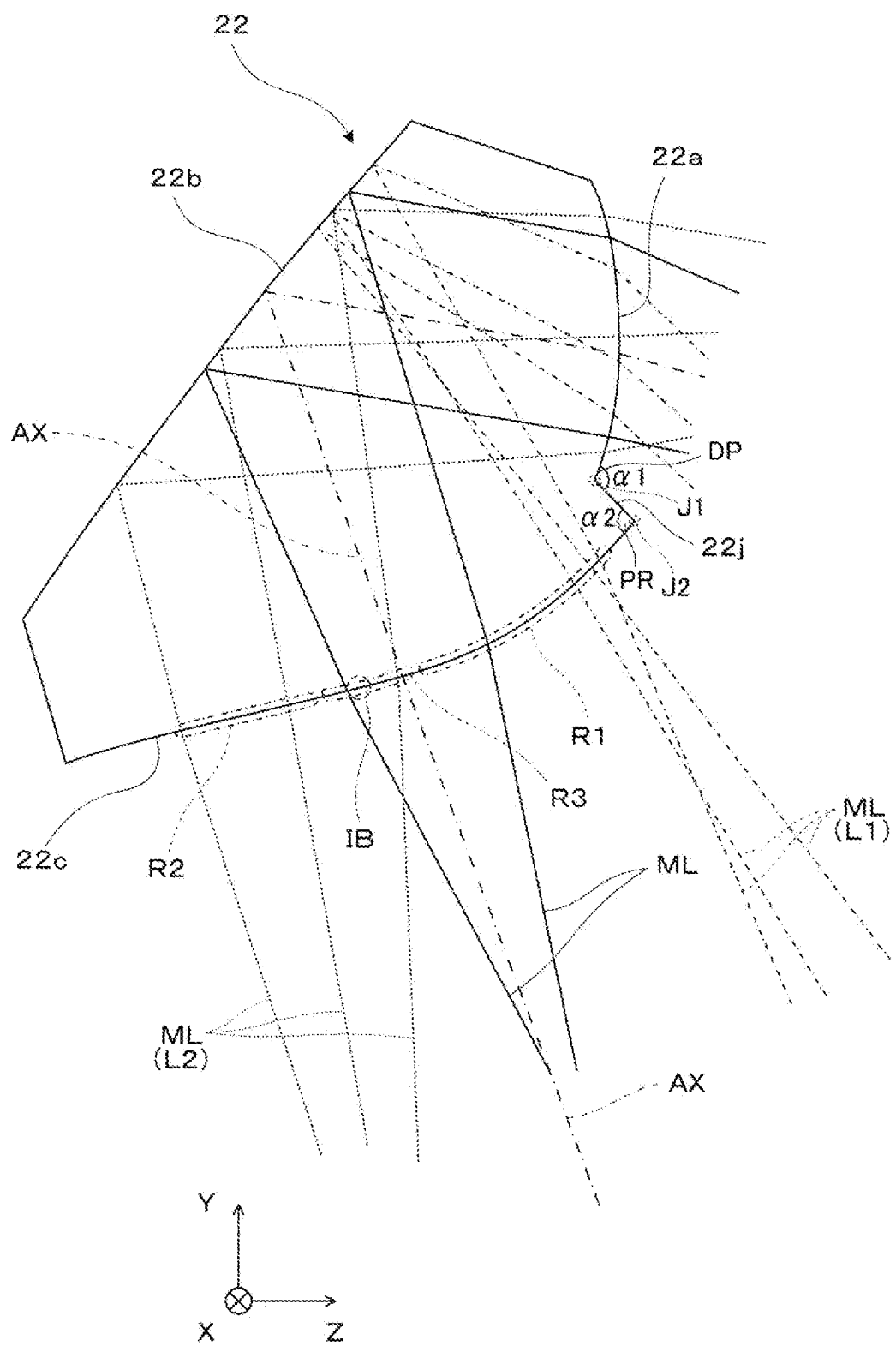

FIG. 4 is a side cross section of the prism mirror 22. In the YZ cross-section, the light emission surface 22c of the prism mirror 22 is a refraction surface having different refractive powers or powers between the +Z side that is the front side and the −Z side that is the rear side. Here, the refractive power is determined from the curvature obtained by fitting an arc or a spherical surface to a region of interest using a least squares method or the like, and a refractive index of a main body of the prism mirror 22.

In the off-axis type imaging optical system 12 as shown in FIG. 3, because the see-through mirror 23 is disposed in an eccentric state, and light rays incident on an upper portion (the top portion side) and a lower portion (the ground side) of the see-through mirror 23 have different angles of incidence on the reflection surface 23a, a difference in a light ray magnification due to oblique incidence occurs. Specifically, light rays L1 incident on the upper portion of the see-through mirror 23 have a strong obliquely incident state, and light rays L2 incident on the lower portion of the see-through mirror 23 have a weak obliquely incident state. Therefore, unless special measures are taken, in the case of the light rays L1 incident on the upper portion of the see-through mirror 23, a difference in a light ray angle tends to be relatively small compared to the light rays L2 incident on the lower portion of the see-through mirror 23, resulting in an optical system with large distortion in which a difference in the magnification occurs in the up-down direction. Here, the distortion of the observed virtual image can be reduced by making the display image formed on the display surface 11a of the image element 11 a pre-distorted modified image, but when the original distortion is large, a certain degree of resolution degradation, that is, image quality degradation is unavoidable.

On the other hand, in the case of the present embodiment, as shown in FIG. 4, the light emission surface 22c of the prism mirror 22 has a front region R1 having positive refractive power and a rear region R2 having negative refractive power in a Y-Z cross section. However, in the shown example, the rear region R2 is almost flat and has weak negative refractive power. The front region R1 and the rear region R2 are included in regions RA1 and RA2 that extend symmetrically on the light emission surface 22c with the Y-Z plane including the optical axis AX interposed therebetween. Here, the refractive power is a refractive power of a single surface when seen in the Y-Z cross section, in the case in which it is approximated by a spherical surface, and when a distance to an intersection point of the light rays with the optical axis or to an image position inside the light emission surface 22c is referred to as s, the refractive index of the main body of the prism mirror 22 is referred to as n and the distance to the intersection point of the light rays with the optical axis or to the image position outside the light emission surface 22c (that is, in the air) is referred to as s', the refractive power is given by n/s+1/s'. The distance s is a negative value when the virtual image is formed outside the light emission surface 22c. When a place of interest on the light emission surface 22c is a concave surface toward the outside, a focal length is expressed as negative, and the refractive power is also negative. On the other hand, when the place of interest on the light emission surface 22c is a convex surface toward the outside, the focal length is expressed as positive, and the refractive power is also positive. An intermediate region R3 that has almost no refractive power is present between the front region R1 and the rear region R2, and in the intermediate region R3, an inflection point IB is present corresponding to the switching of the sign of the refractive power. As will be apparent from the foregoing, in the case of the present embodiment, the light emission surface 22c has the front region R1 having a relatively high refractive power and the rear region R2 having a relatively low refractive power. In other words, the refractive power of the front region R1 in the light emission surface 22c is greater than the refractive power of the rear region R2. As a result, a degree of convergence of the rear region R2 with respect to the light rays passing through the rear region R2 is weaker than a degree of convergence of the front region R1 with respect to the light rays passing through the front region R1. In this way, when the refractive power of the front region R1 is greater than the refractive power of the rear region R2, in the imaging optical system 12, because the difference in the magnification generated along the up-down Y-Z cross section can be curbed and the occurrence of distortion can be curbed, the image quality with respect to the observed virtual image can be improved. Here, the reason why a difference in refractive power is provided between the front region R1 and the rear region R2 of the light emission surface 22c is because the light emission surface 22c is located at a position relatively far from the intermediate pupil IPa and is because it is possible to exert different refraction actions on the light ray L1 incident on the upper portion of the see-through mirror 23 and the light ray L2 incident on the lower portion of the see-through mirror 23. In addition, in the light emission surface 22c, an action that cancels out an effect of an incident position of the see-through mirror 23 in which the obliquely incident state is strengthened at the upper portion (the top portion side) of the see-through mirror 23 and the light rays are enlarged and magnification is given is caused by making the refractive power of the front region R1 greater than the refractive power of the rear region R2, and it becomes easy to make the difference in the light ray angle on the display surface 11a in the light ray L1 incident on the upper portion of the see-through mirror 23 relatively large.

In a joint between the light incident surface 22a and the light emission surface 22c of the prism mirror 22, the surfaces of end portions have different heights in a state in which they are almost parallel to each other. Thus, a flat connection surface 22j that forms a step is provided between the light incident surface 22a and the light emission surface 22c. A boundary J1 between the light incident surface 22a and the connection surface 22j is a recess DP connected at an obtuse angle α1, and a boundary J2 between the light emission surface 22c and the connection surface 22j is a protrusion PR connected at an obtuse angle α2. In other words, the prism mirror 22 has the recess DP having an obtuse angle at a boundary between the light incident surface 22a and the light emission surface 22c in the Y-Z cross section along the reference surface.

In the above, although the front region R1 has positive refractive power and the rear region R2 has negative refractive power, the present disclosure is not limited thereto. For example, both the front region R1 and the rear region R2 may have positive refractive power, and the refractive power of the front region R1 may be greater than the refractive power of the rear region R2. In this case, the front region R1 has a large convex shape, and the rear region R2 has a convex shape close to a flat surface.

Figure 5:
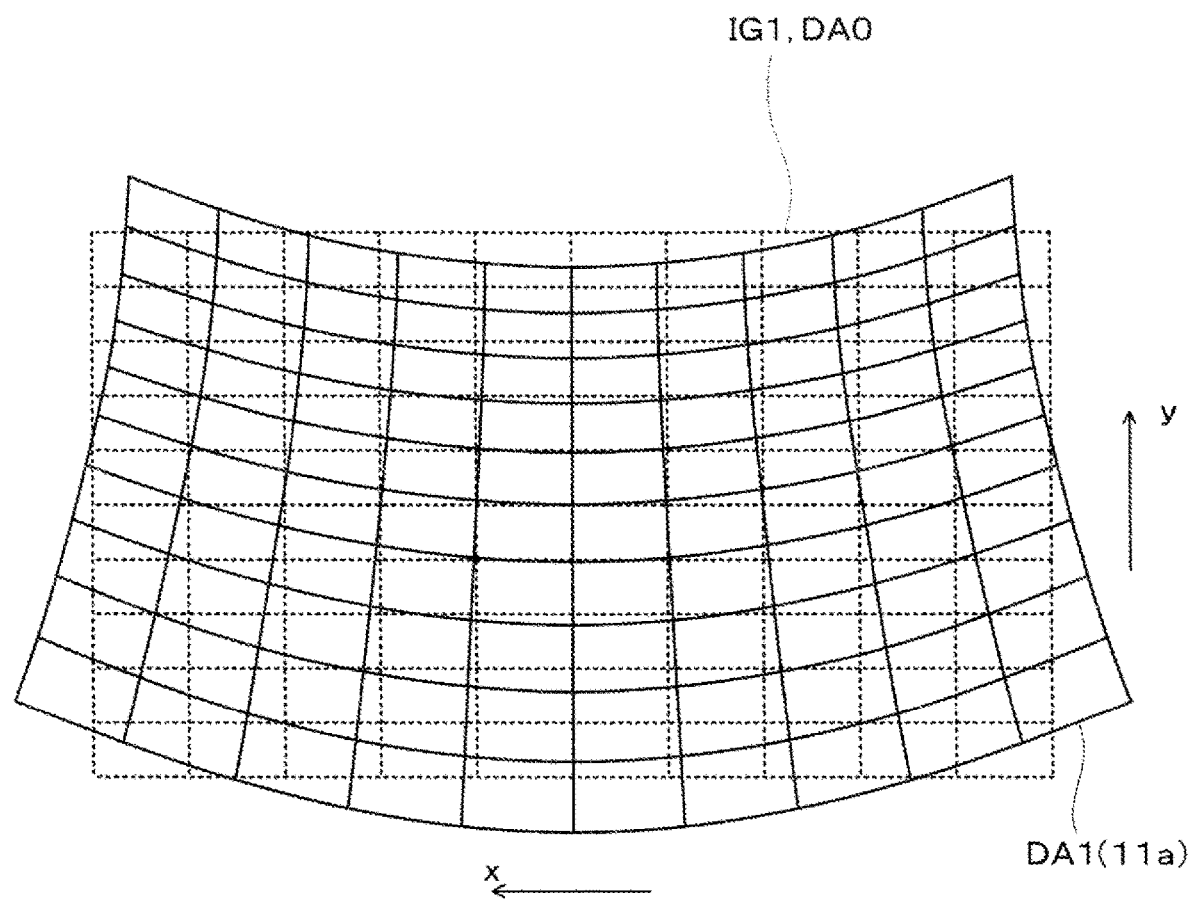
FIG. 5 is a diagram showing distortion correction of a display image.

As shown in FIG. 5, a display image formed on the display surface 11a of the image element 11 is a modified image DA1 having distortion such as trapezoidal distortion in advance. That is, because the imaging optical system 12 is the off-axis optical system 112, it is not easy for the optical system itself to remove distortion such as trapezoidal distortion. Therefore, the image displayed on the image element 11 is caused to have reverse distortion that cancels out the distortion formed by the projection lens 21, the prism mirror 22, and the see-through mirror 23, and thus a pixel array of a projected image IG1 of the virtual image observed at the pupil position PP via the imaging optical system 12 may be a grid pattern corresponding to the original display image DA0, and the contour can be rectangular. In other words, the image element 11 corrects the distortion generated by the projection lens 21, the prism mirror 22, and the see-through mirror 23. As a result, aberrations can be curbed as a whole including that of the image element 11 while the distortion generated by the see-through mirror 23 and the like is allowed. Thus, the degree of freedom in the arrangement and size of optical elements such as the prism mirror 22 is increased, and it is possible to easily secure the optical performance of the display device 100 while miniaturization of the display device 100 is achieved. An aspect ratio of the modified image DA1 shown is 17:9, an aspect ratio of the projected image IG1 or the display image DA0 is 16:9, and a difference between both the aspect ratios is relatively small. In other words, the distortion of the imaging optical system 12 of the embodiment is relatively small. As a result, even when the distortion is corrected by distorting the display image formed on the display surface 11a, the occurrence of resolution deterioration can be curbed.

Figure 6:
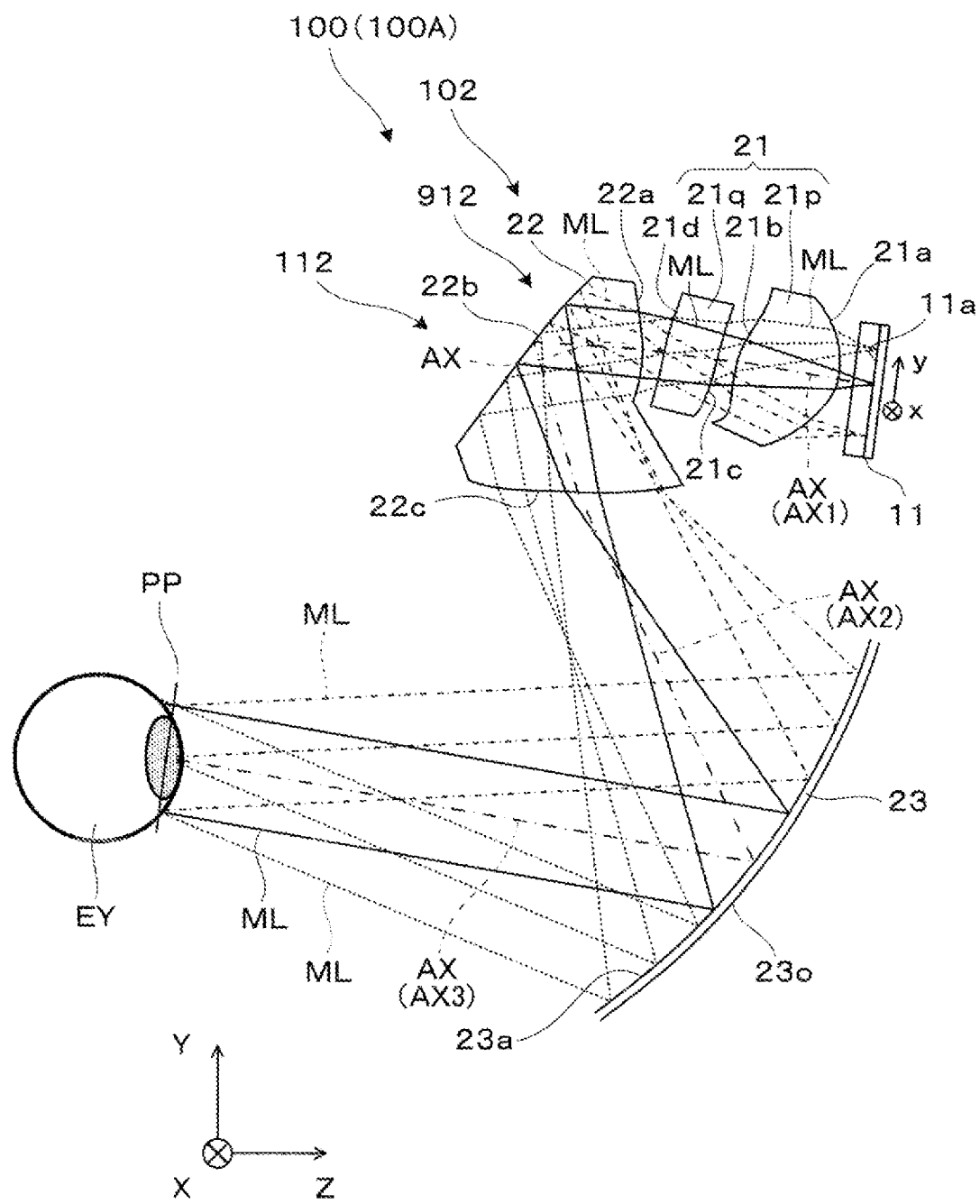
FIG. 6 is a side cross-sectional view showing an optical system according to a comparative example.

FIG. 6 is a side cross-sectional view showing an imaging optical system 912 according to a comparative example. This imaging optical system 912 is an optical system similar to the imaging optical system 12 and having the optical element 21, 22, and 23 in common with the imaging optical system 12 shown in FIG. 3 and the like, but the light emission surface 22c of the prism mirror 22 is a uniform convex surface. In other words, the light emission surface 22c is a refraction surface of which refractive power is substantially the same on the +Z side which is the front side and the -Z side which is the rear side. In this case, the light rays L1 incident on the upper portion of the see-through mirror 23 have a relatively small difference in the light ray angle due to the strong obliquely incident state, NA decreases, the distribution of the light rays becomes coarse, and the magnification is relatively increased.

Figure 7:
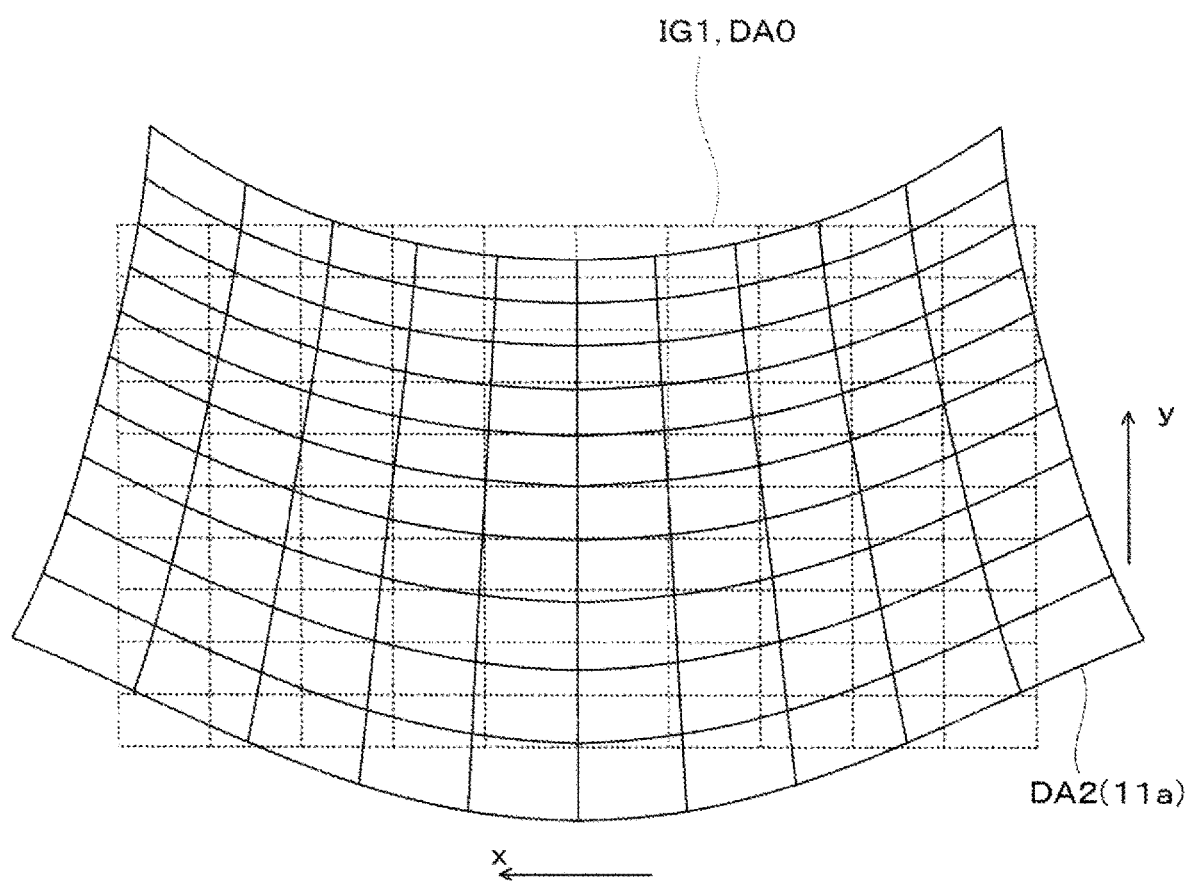
FIG. 7 is a diagram showing the distortion correction of the display image in the optical system of FIG. 6.

FIG. 7 is a diagram showing a display image formed on the display surface 11a of the image element 11 in the imaging optical system 912 according to the comparative example shown in FIG. 6. In this case as well, the display image formed on the display surface 11a of the image element 11 is a pre-distorted modified image DA2. However, due to the light emission surface 22c being a uniform convex surface, the modified image DA2 shown in FIG. 7 has larger distortion than in the modified image DA2 shown in FIG. 5, and the distribution of the difference in the magnification in the up-down direction, that is, the y direction is large. Therefore, in the imaging optical system 912 according to the comparative example, the burden of distortion correction increases compared to the imaging optical system 12 according to the embodiment shown in FIG. 3 and the like, resolution for the observed virtual image decreases, and the deterioration in image quality occurs. An aspect ratio of the modified image DA2 shown is 20:9, an aspect ratio of the projected image IG1 or the display image DA0 is 16:9, and the difference between the both aspect ratios is relatively large. In other words, the distortion of the imaging optical system 912 according to the comparative example is greater than the distortion of the imaging optical system 12 according to the embodiment.

Figure 8:
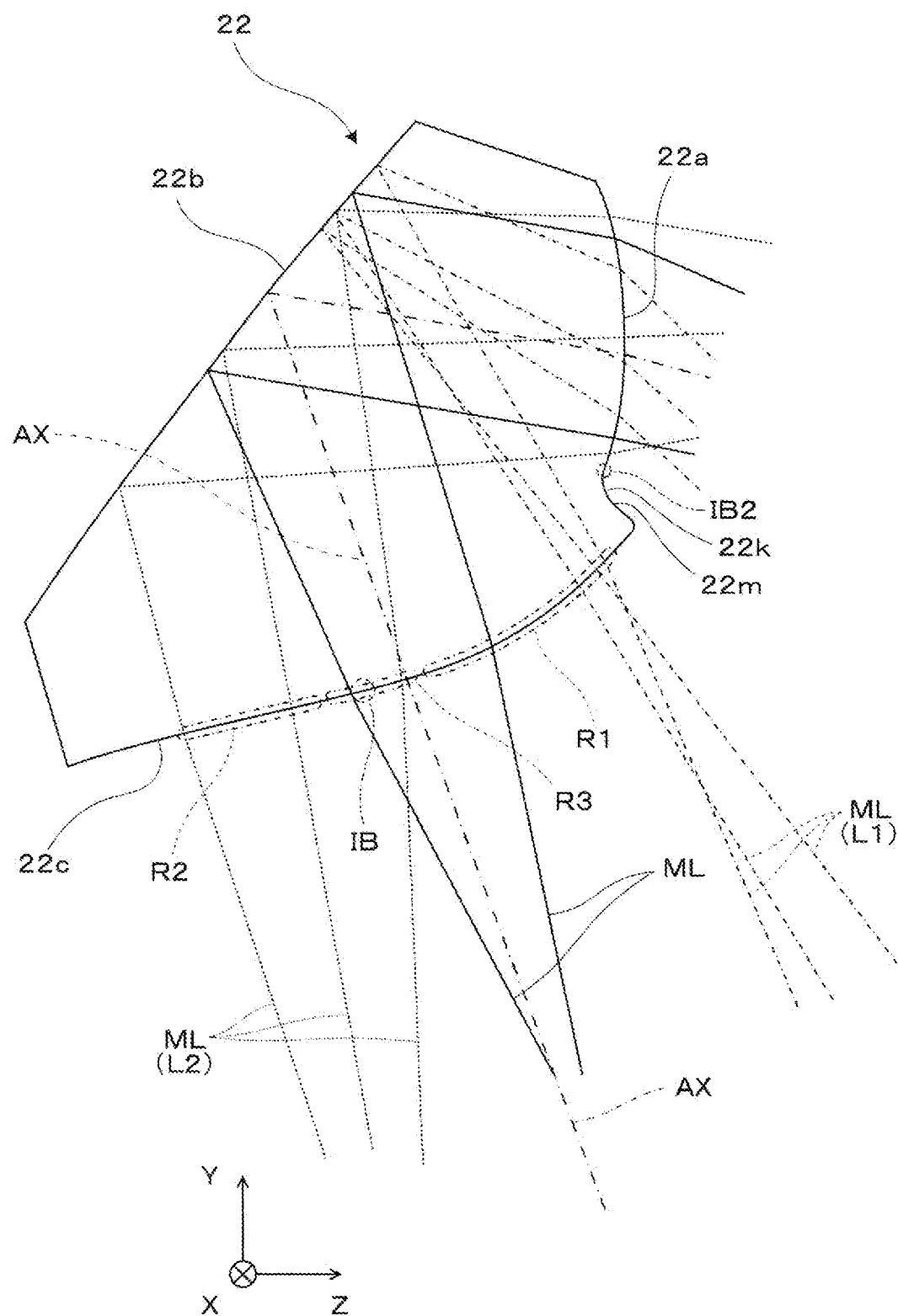
FIG. 8 is a partially enlarged cross-sectional view showing a prism mirror according to a modified example.

FIG. 8 is an enlarged side cross-sectional view corresponding to FIG. 4 and shows an example in which a shape of the prism mirror 22 is changed. In this case, a connection surface 22k having an S-shaped cross section is provided at the joint between the light incident surface 22a and the light emission surface 22c. The connection surface 22k is a curved surface that smoothly connects the light incident surface 22a to the light emission surface 22c, has an inflection point IB2 at a position close to the light incident surface 22a, and has a concave region 22m at a position close to the light emission surface 22c.

The display device 100 according to the first embodiment described above includes the image element 11, the projection lens 21 that causes the image light ML from the image element 11 to pass therethrough, the prism mirror 22 that causes the image light ML emitted from the projection lens 21 to be incident from the light incident surface 22a, reflects the image light ML with the inner reflection surface 22b, and emits the image light ML from the light emission surface 22c, and the see-through mirror 23 that reflects the image light ML emitted from the prism mirror 22 toward the pupil position, wherein the prism mirror 22 and the see-through mirror 23 are disposed so that an optical path is folded along a Y-Z plane which is a reference surface to form an off-axis optical system 112, and an intermediate image IM is formed between the inner reflection surface 22b and the see-through mirror 23, and the light emission surface 22c is included between the inner reflection surface 22b and the see-through mirror 23 as a refraction surface having the front region R1 having a relatively high refractive power on the front side and the rear region R2 having a relatively low refractive power on the rear side with respect to the reference surface. Thus, it is possible to adjust the angle of light rays at a position relatively far from the intermediate pupil IPa, and it is possible to reduce the distortion of the projected image by curbing a relative increase in the imaging magnification of the light rays L1 passing through the front side, and thus it is possible to curb the deterioration of image quality.

Second Embodiment

Hereinafter, a display device and the like according to a second embodiment of the present disclosure will be described. The display device of the second embodiment is obtained by modifying a part of the display device of the first embodiment, and description of common parts will be omitted.

The display device 100 of the second embodiment will be described with reference to FIG. 9. In the case of the display device 100 according to the present embodiment, the projection lens 21 includes two lens elements 21p and 21q, and a plate-shaped optical element 28 is disposed between the prism mirror 22 and the see-through mirror 23. The refractive index of the optical element 28 is different from the refractive index of the prism mirror 22. Thus, the degree of refraction and dispersion can be adjusted between the optical element 28 and the prism mirror 22 and the like, and thus, for example, achromatization can be easily achieved. A first surface 28a provided on the incident side of the optical element 28 is flat, but is a freely curved surface, has asymmetry with respect to the up-down direction parallel to the Y-Z plane with the optical axis AX interposed therebetween, and has symmetry with respect to the X direction, that is, the transverse direction perpendicular to the Y-Z plane with the optical axis AX interposed therebetween. An antireflection film is formed at the first surface 28a. A second surface 28b provided on the emission side of the optical element 28 is a flat surface, and an antireflection film is formed thereon. The optical element 28 is a wedge-shaped prism 128 of which a thickness increases on the +Z side that is the front side. In other words, when a thickness of a front end 28f of the optical element 28 is to and a thickness of a rear end 28r of the optical element 28 is tb, a relationship ta>tb is established. The thicknesses of the front end 28f and the rear end 28r are considered in effective regions of the first surface 28a and the second surface 28b, and dimensions in the direction of the optical axis AX are compared.

The optical element 28 contributes to the imaging in combination with the prism mirror 22, and is disposed on the prism mirror 22 side or the image element 11 side with respect to the intermediate image IM.

In the description above, the first surface 28a on the incident side of the optical element 28 is a freely curved surface and the second surface 28b on the injection side is a flat surface, but the first surface 28a may be a flat surface and the second surface 28b may be a freely curved surface. Further, both the first surface 28a and the second surface 28b may be freely curved surfaces, and both the first surface 28a and the second surface 28b may be flat surfaces.

The light emission surface 22c of the prism mirror 22 is a refraction surface having different refractive power on the +Z side that is the front side and the −Z side that is the rear side. In the light emission surface 22c, when the front region R1 is a surface having positive refractive power and the rear region R2 is a surface having negative refractive power, the difference in the light ray angle of the light rays L1 incident on the upper portion of the see-through mirror 23 at the display surface 11a can be relatively large, and a dominant distortion component can be removed. On the other hand, due to consideration with respect to the difference in the light ray angle or the difference in the magnification as described above, the position of the intermediate image IM tends to be shifted with respect to the light rays L2 incident on the lower portion of the see-through mirror 23 to approach the see-through mirror 23, and the position of the intermediate image IM tends to be shifted with respect to light rays L1 incident on the upper portion of the see-through mirror 23 to be away from the see-through mirror 23. As a result, even though the dominant distortion component can be removed, a state in which the imaging is adjusted by the inner reflection surface 22b and the projection lens 21 in accordance with the modification of the light emission surface 22c occurs, a difference in the magnification occurs in the up-down direction parallel to the Y-Z plane or the transverse direction perpendicular thereto, and there is a tendency for the removal of the distortion to be insufficient. In order to reduce such distortion, it is effective to increase the optical path of the light rays L1 incident on the upper portion of the see-through mirror 23. Therefore, it is possible to give an effect such as a trapezoidal correction to further reduce the distortion as a whole by disposing the wedge-shaped prism 128 having a thick front end 28f and a thin rear end 28r at a position at which it faces the light emission surface 22c of the prism mirror 22.

The significance of the wedge-shaped prism 128 will be described in more detail. For example, in the imaging optical system 12 of the first embodiment shown in FIG. 3, when the light emission surface 22c is disposed to avoid a point at which the light rays L1 incident on the upper portion of the see-through mirror 23 is focused as the intermediate image IM, the light emission surface 22c is inclined to be located on the +Y side on the +Z side. In such a case, for the light rays L1 incident on the upper portion of the see-through mirror 23, a length of the optical path decreases relatively, and a focal point is shifted in a direction away from the see-through mirror 23, the difference in magnification, that is, the distortion between the light rays L1 incident on the upper portion of the see-through mirror 23 and the light rays L2 incident on the lower portion of the see-through mirror 23 increases, and the optical performance, that is, the resolution is not easily improved. On the other hand, as in the imaging optical system 12 of the second embodiment, the length of the optical path can relatively increase with respect to the light rays L1 incident on the upper portion of the see-through mirror 23 by disposing the wedge-shaped prism 128 having an increased thickness on the +Z side which is the front side and facing the light emission surface 22c of the prism mirror 22, and the focal point thereof can be shifted in a direction in which it approaches the see-through mirror 23. In particular, when the refractive index of the wedge-shaped prism 128 is greater than the refractive index of the prism mirror 22, the above-described effect in which the focal point of the light rays L1 is shifted in the direction in which it approaches the see-through mirror 23 increases, and as a result, it becomes easy to improve the resolution of the imaging optical system 12. In the case of the present embodiment, a lens element 21q has a high refractive index with respect to the prism mirror 22, and the lens element 21p has a low refractive index with respect to the lens element 21q.

The image element 11, the projection lens 21, and the prism mirror 22 are supported and fixed into the case 51. The opening 51a of the case 51 is sealed by the optical element 28. In other words, the case 51 air-tightly or liquid-tightly seals the optical path space OS from the image element 11 to the prism mirror 22 therein, and protects the image element 11, the projection lens 21, and the like from dust, water droplets, and the external air.

The display device 100 of the above-described second embodiment includes the wedge-shaped prism 128 disposed between the prism mirror 22 and the see-through mirror 23, and thus can curb the occurrence of distortion caused by the prism mirror 22 and the like.

Figure 10:
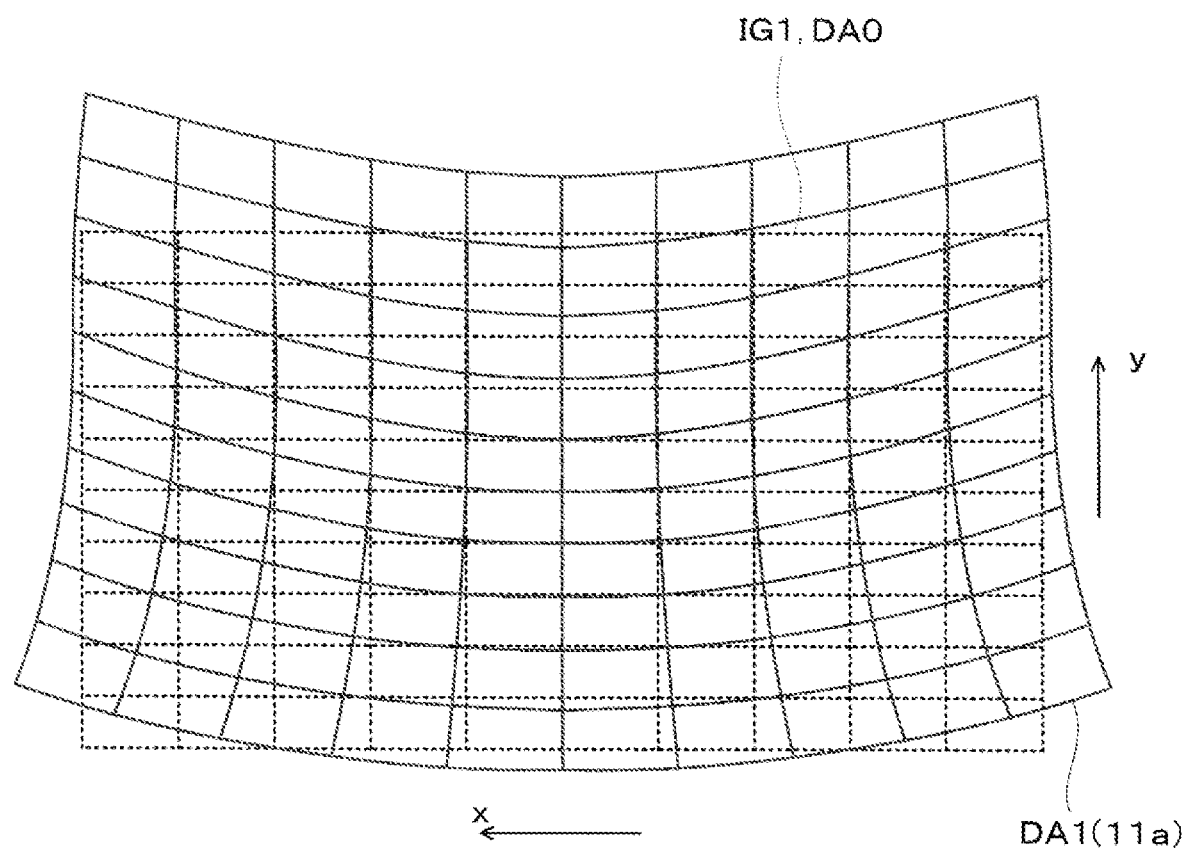
FIG. 10 is a diagram showing the distortion correction of the display image in the optical system of FIG. 9.

FIG. 10 is a diagram showing a display image formed on the display surface 11a of the image element 11 in the imaging optical system 912 according to the comparative example shown in FIG. 6. Also, in the case of the second embodiment, the display image formed on the display surface 11a of the image element 11 is the pre-distorted modified image DA1. However, in the modified image DA1 shown in FIG. 10, because the wedge-shaped prism 128 is disposed to face the light emission surface 22c of the prism mirror 22, the distortion is less than that in the modified image DA1 shown in FIG. 5. Thus, in the imaging optical system 12 of the display device 100 of the second embodiment, the resolution of the observed virtual image can be enhanced, and the degradation of image quality can be further reduced.

Figure 9:
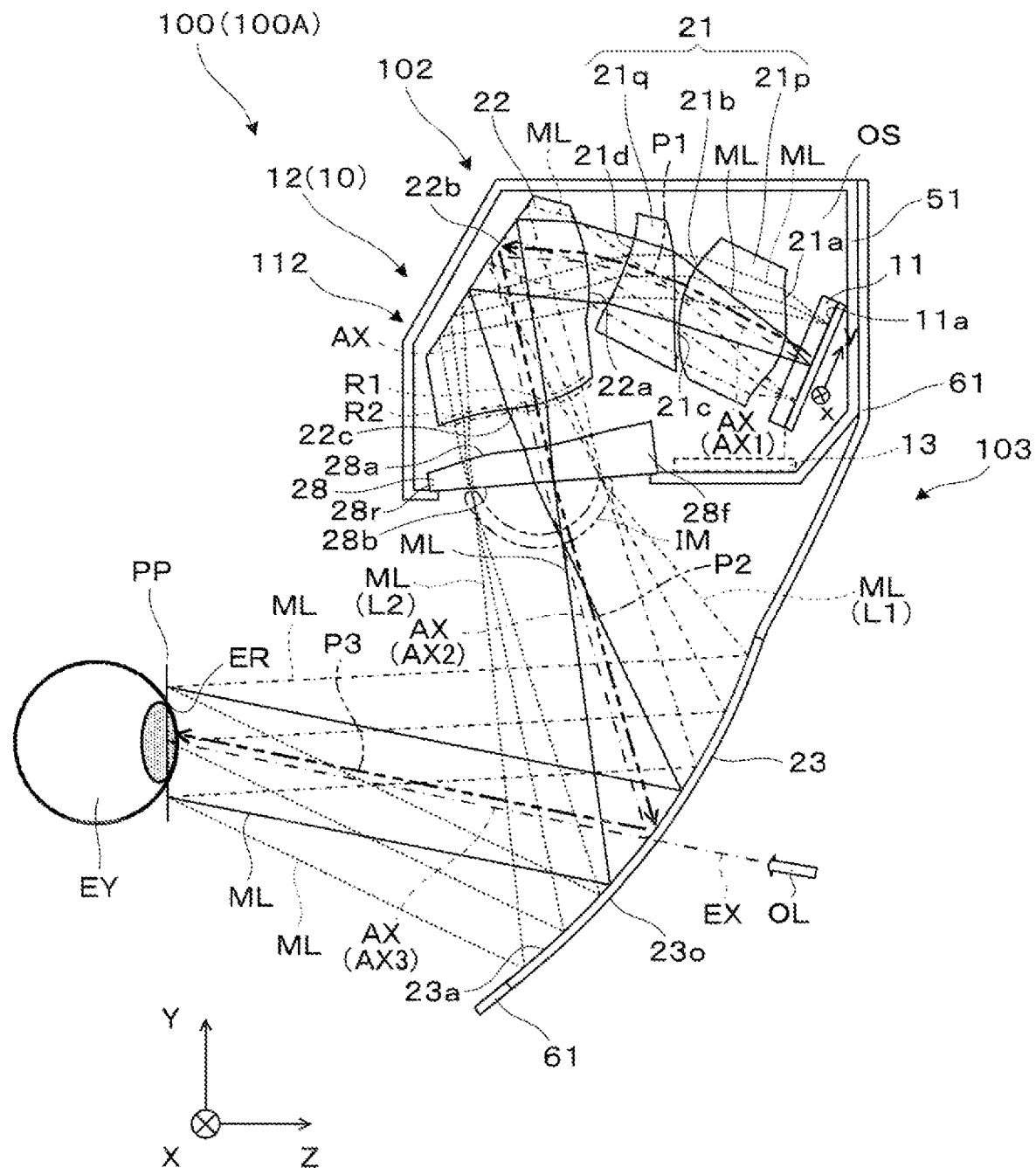
FIG. 9 is a side cross-sectional view showing a display device according to a second embodiment.
Figure 11:
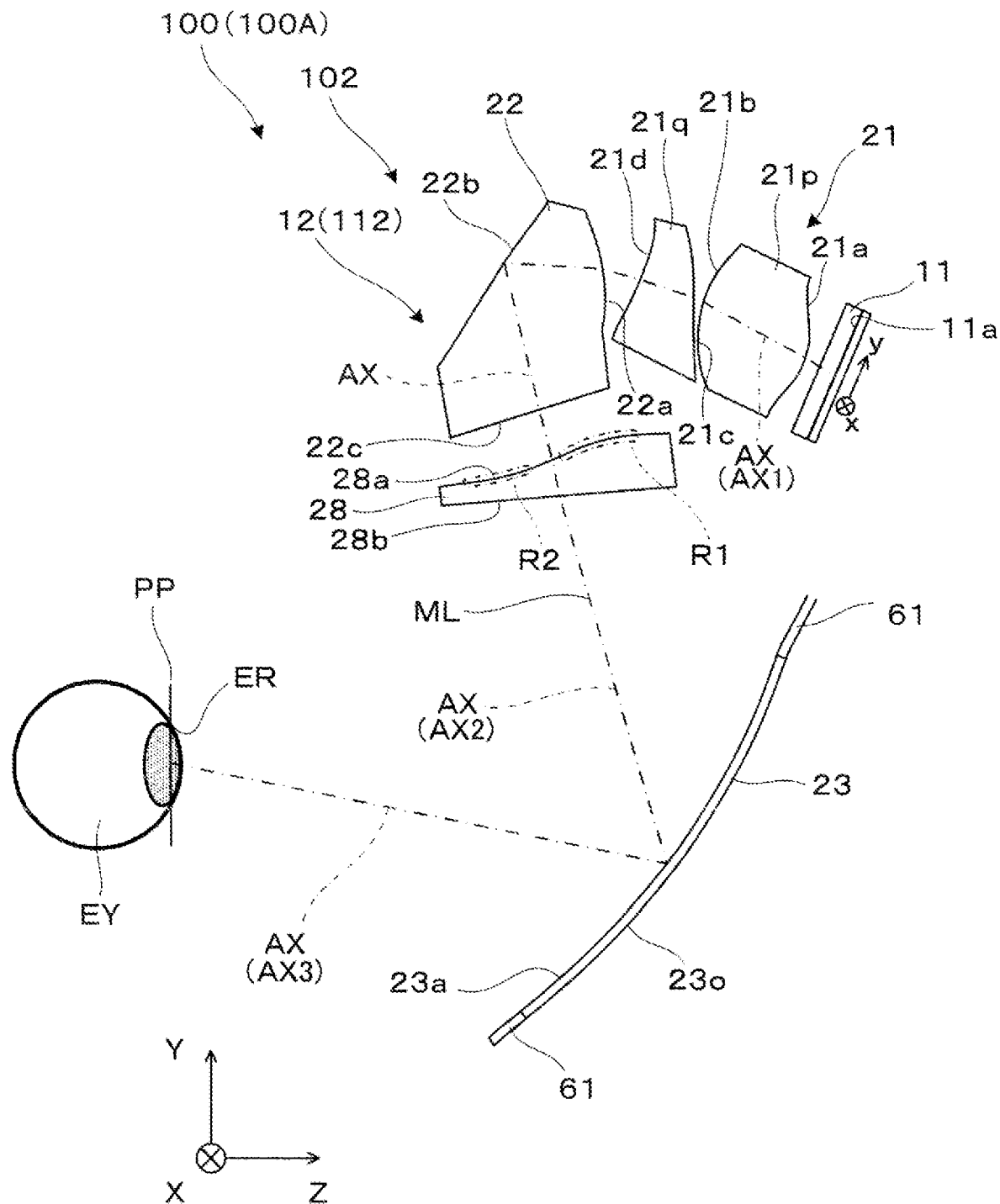
FIG. 11 shows a modified example of the display device shown in FIG. 9.

FIG. 11 shows a modified example of the display device 100 shown in FIG. 9. In this case, although the light emission surface 22c of the prism mirror 22 is flat, in the first surface 28a of the wedge-shaped prism 128, the front region R1 is a surface having positive refractive power with respect to the up-down Y-Z plane, and the rear region R2 is a surface having negative refractive power with respect to the up-down Y-Z plane. That is, the first surface 28a is a refraction surface in which the refractive power of the front region R1 is greater than the refractive power of the rear region R2. The second surface 28b of the wedge-shaped prism 128 is a flat surface.

Although not shown, the first surface 28a and the second surface 28b of the wedge-shaped prism 128 of FIG. 11 may be replaced in a shape. In other words, the first surface 28a may be a flat surface, and in the second surface 28b, a surface having positive refractive power with respect to the up-down Y-Z plane may be formed in the front region, and a surface having negative refractive power with respect to the up-down Y-Z plane may be formed in the rear region. In this case, the second surface 28b is a refraction surface in which the refractive power or power differs between the +Z side that is the front side and the −Z side which is the rear side. Alternatively, in both the first surface 28a and the second surface 28b, a surface having positive refractive power with respect to the up-down Y-Z plane may be formed in the front region, and a surface having negative refractive power with respect to the up-down Y-Z plane may be formed in the rear region.

Figure 12:
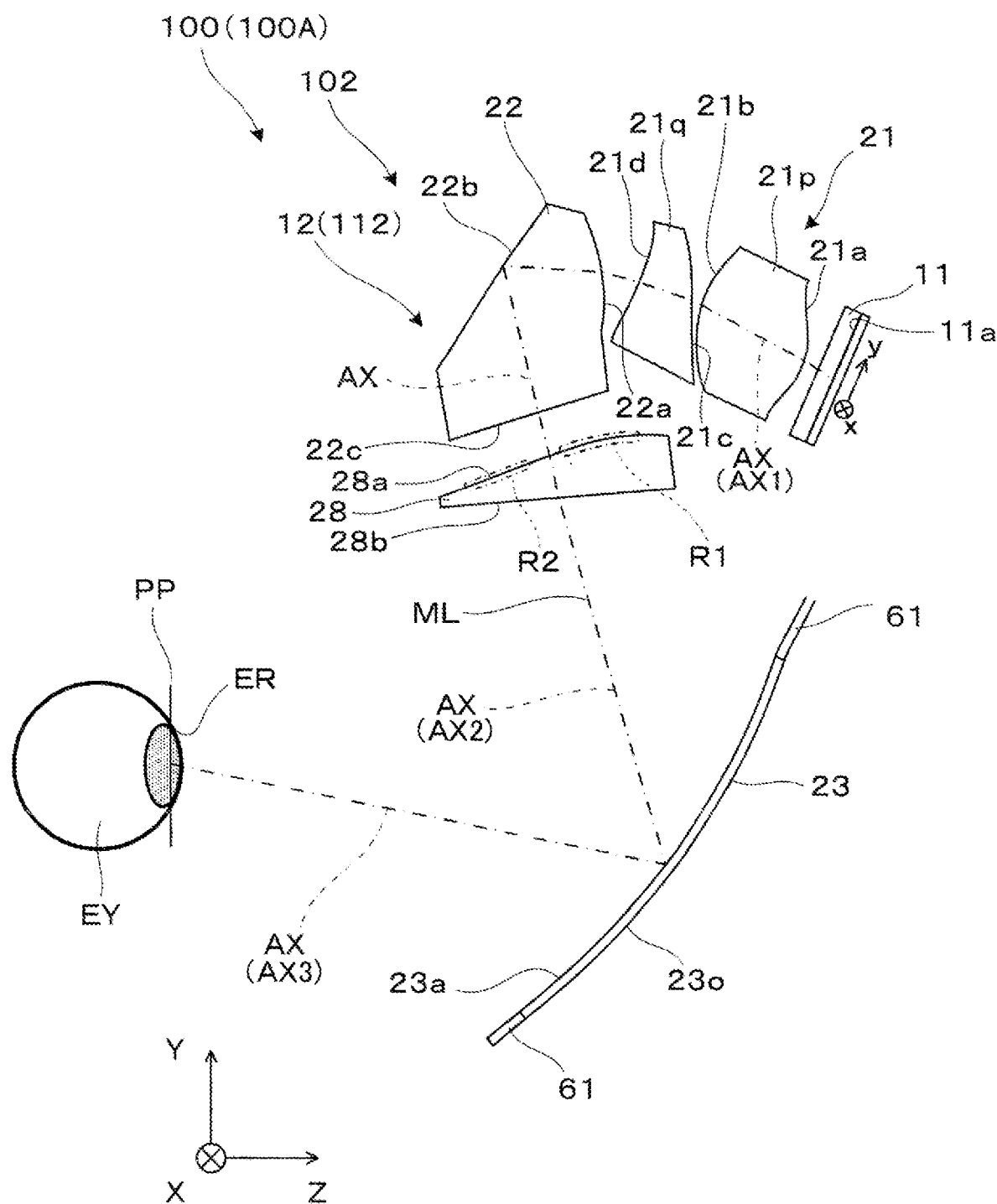
FIG. 12 shows another modified example of the display device shown in FIG. 9.

FIG. 12 shows another modified example of the display device 100 shown in FIG. 9. In this case, the light emission surface 22c of the prism mirror 22 is flat, but the first surface 28a of the wedge-shaped prism 128 is an overall convex surface with respect to the up-down Y-Z plane. The wedge-shaped prism 128 can have refractive power, and the imaging state can be adjusted by forming the convex surface on the wedge-shaped prism 128 in this way. Furthermore, in the first surface 28a of the wedge-shaped prism 128, the front region R1 is a surface having a strong positive refractive power with respect to the up-down Y-Z plane, and the rear region R2 is a surface having a weak positive refractive power with respect to the up-down Y-Z plane. That is, the first surface 28a is a refraction surface in which the refractive power of the front region R1 is greater than the refractive power of the rear region R2. The second surface 28b of the wedge-shaped prism 128 is a flat surface.

Although not shown, the first surface 28a and the second surface 28b of the wedge-shaped prism 128 of FIG. 12 may be replaced in a shape. That is, the first surface 28a may be a flat surface, and in the second surface 28b, a surface having strong positive refractive power with respect to the up-down Y-Z plane may be formed in the front region, and a surface having weak positive refractive power with respect to the up-down Y-Z plane may be formed in the rear region. In this case, the second surface 28b is a refraction surface in which the refractive power or power differs between the +Z side that is the front side and the −Z side that is the rear side. Alternatively, in both the first surface 28a and the second surface 28b, a surface having a strong positive refractive power with respect to the up-down Y-Z plane may be formed in the front region, and a surface having a weak positive refractive power with respect to the up-down Y-Z plane may be formed in the rear region.

Figure 13:
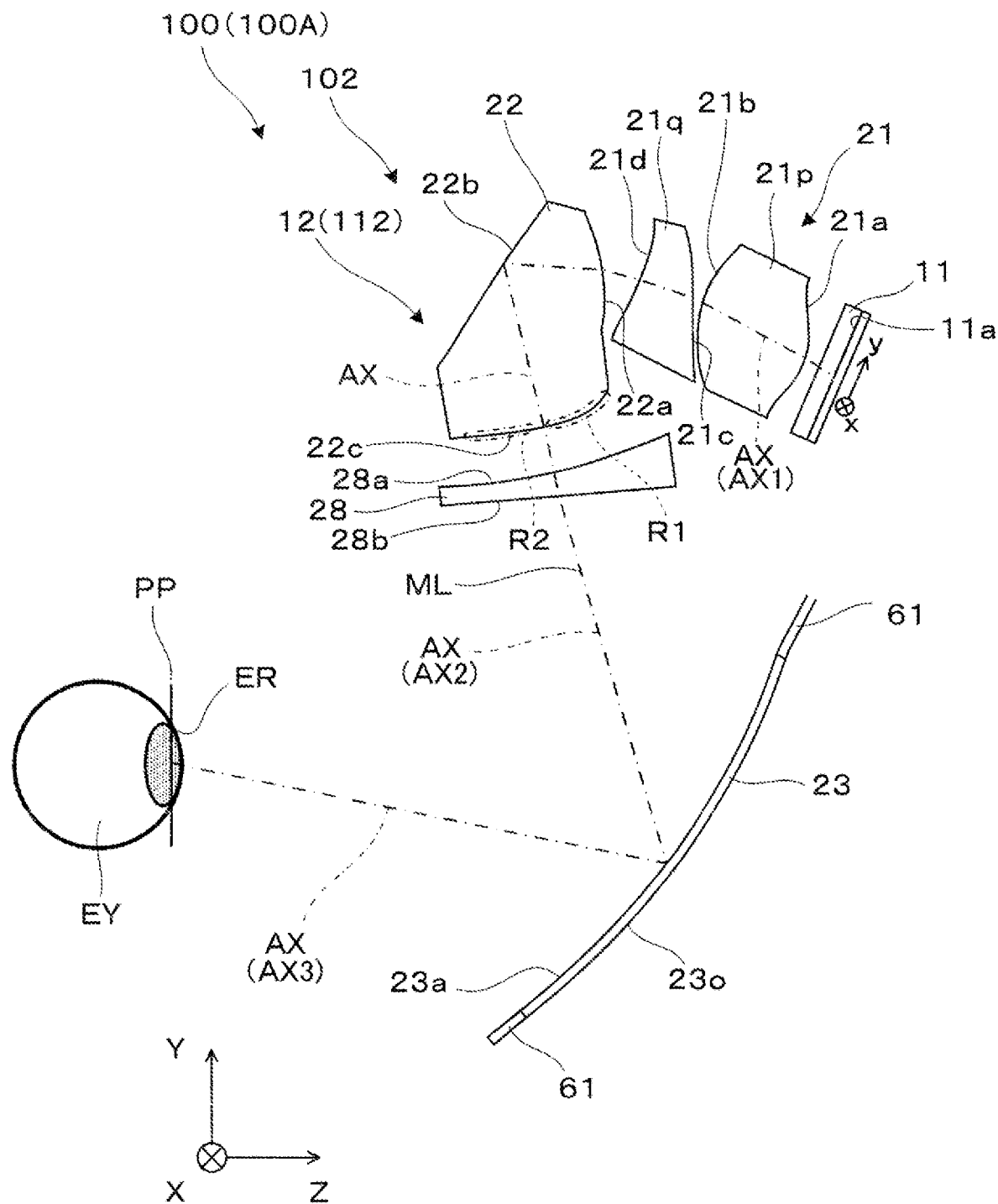
FIG. 13 shows yet another modified example of the display device shown in FIG. 9.

FIG. 13 shows yet another modified example of the display device 100 shown in FIG. 9. In this case, the light emission surface 22c of the prism mirror 22 has an overall convex surface with respect to the up-down Y-Z plane, and the first surface 28a of the wedge-shaped prism 128 is a concave surface as a whole with respect to the up-down Y-Z plane. The wedge-shaped prism 128 can have refractive power, and the imaging state can be adjusted by forming the concave surface in the wedge-shaped prism 128 in this way. Furthermore, the light emission surface 22c is a surface having strong positive refractive power with respect to the up-down Y-Z plane in the front region R1, and is a surface having weak positive refractive power with respect to the up-down Y-Z plane in the rear region R2. That is, the light emission surface 22c has the front region R1 having relatively high refractive power that is positive refractive power, and the rear region R2 having relatively low refractive power that is positive refractive power. The light emission surface 22c is a refraction surface in which the refractive power of the front region R1 is greater than the refractive power of the rear region R2. The second surface 28b of the wedge-shaped prism 128 is a flat surface. A weight of the wedge-shaped prism 128 can be reduced by making the first surface 28a of the wedge-shaped prism 128 as a concave surface and the second surface 28b as a flat surface.

Although not shown, the first surface 28a and the second surface 28b of the wedge-shaped prism 128 of FIG. 13 can be replaced in a shape. In other words, the first surface 28a may be a flat surface, and the second surface 28b may be a concave surface. Alternatively, both the first surface 28a and the second surface 28b may be concave surfaces.

Modified Examples and Others

The present disclosure is described according to the above-described embodiments, but the present disclosure is not limited to the above-described embodiments. The present disclosure may be carried out in various modes without departing from the gist of the present disclosure, and, for example, the following modifications may be carried out.

In the display device 100 of the above-described embodiment, a spontaneous light emission type display device such as an organic EL element, an LCD, and other light modulation elements are used as the image element 11, but instead of them, a configuration using a laser scanner that combines a laser light source and a scanner such as a polygon mirror may also be used. That is, it is also possible to apply the present disclosure to a laser retinal projection type head-mounted display.

A light control device that controls light by limiting transmitted light of the see-through mirror 23 may be mounted on the outside of the see-through member 23. The light control device adjusts a transmittance, for example, electrically. Mirror liquid crystals, electronic shades, and the like may be used as the light control device. The light control device may adjust a transmittance according to outside light brightness.

In the description above, although it was assumed that the display device 100 was worn on the head and is used, the display device 100 may also be used as a handheld display that is not worn on the head and is to be looked into like binoculars. In other words, the head-mounted display also includes a hand-held display in the present disclosure.

A display device according to a specific aspect includes an image element, a projection lens that transmits image light from the image element, a prism mirror that receives the image light emitted from the projection lens through a light incident surface, reflects the image light with an inner reflection surface, and emits the image light from a light emission surface, and a see-through mirror that reflects the image light emitted from the prism mirror toward a pupil position, wherein the prism mirror and the see-through mirror are disposed so that an optical path is folded along a reference surface to form an off-axis optical system, an intermediate image is formed between the inner reflection surface and the see-through mirror, and a refraction surface having a region having a relatively high refractive power on a front side and a region having a relatively low refractive power on a rear side is included between the inner reflection surface and the see-through mirror, with respect to the reference surface.

In the above-described display device, because the display device includes an optical surface having a region with relatively high refractive power on the front side and a region having relatively low refractive power on the rear side with respect to the reference surface between the inner reflection surface and the see-through mirror, an angle of the light rays can be adjusted at a position relatively away from the intermediate pupil, and occurrence of a relative increase in imaging magnification for the light rays passing through the front side is curbed, distortion of the projected image can be reduced, and degradation of image quality can be curbed.

In a particular aspect, an inflection point is provided between the region having the high refractive power and the region having the low refractive power.

In a particular aspect, the region having the high refractive power has positive refractive power, and the region having the low refractive power has negative refractive power. The region having the high refractive power curbs a relative increase in the imaging magnification, and the region having the low refractive power curbs a relative reduction in the imaging magnification.

In a particular aspect, the region having the high refractive power and the region having the low refractive power have positive refractive power. In this case, while the optical surface has the positive refractive power as a whole, it is possible to curb occurrence of the difference in imaging magnification between the light rays passing through the front side and the light rays passing through the rear side.

In a specific aspect, the refraction surface is a light emission surface of the prism mirror. In this case, the prism mirror itself can have a function to reduce the distortion of the projected image.

In a specific aspect, an optical element disposed between the prism mirror and the see-through mirror and having the refraction surface is further included. In this case, the optical element disposed on the emission side of the prism mirror has a function to reduce the distortion of the projected image.

In a specific aspect, a refractive index of the optical element and a refractive index of the prism mirror are different from each other. The degree of refraction and dispersion between the optical element and the prism mirror and the like can be adjusted, and, for example, achromatization can be easily achieved.

In a specific aspect, the optical element is a wedge-shaped prism of which a thickness increases on a front side. The wedge-shaped prism curbs the occurrence of distortion caused by prism mirror and the like.

In a specific aspect, a refractive index of the wedge-shaped prism is higher than a refractive index of the prism mirror. In this case, the resolution can be easily improved while the degree of freedom of the shape of the prism mirror is increased.

In a particular aspect, the wedge-shaped prism has a convex or concave surface. The wedge-shaped prism can have refractive power by forming the convex or concave surface on the wedge-shaped prism in this way, and the imaging state can be adjusted.

In a specific aspect, the prism mirror has a recess having an obtuse angle at a boundary between the light incident surface and the light emission surface in a cross section along the reference surface.

In another aspect, the reference surface extends in a up-down direction. In this case, the optical elements constituting the display device are disposed in the up-down direction, and an increase in a transverse width of the display device can be prevented.

In a specific aspect, the optical path from the image element to the prism mirror is disposed above an upper end of the see-through mirror. In this case, the optical unit is disposed on the top, and thus the display device can be easily fitted onto the face.

In a specific aspect, a width of the prism mirror in a transverse direction perpendicular to the reference surface is greater than a width thereof in a forward and rearward direction parallel to the reference surface. In this case, a wide angle of view in the transverse direction can be ensured.

In a specific aspect, the image element corrects distortion generated by the projection lens, the prism mirror, and the see-through mirror. In this case, the degree of freedom in the arrangement and size of the optical elements such as the prism mirror and the like is increased, and it is possible to easily ensure the optical performance of the display device while miniaturization of the display device is achieved.

A display device according to a specific aspect includes an image element, a projection lens that transmits image light from the image element, a prism mirror that receives the image light emitted from the projection lens through a light incident surface, reflects the image light with an inner reflection surface, and emits the image light from a light emission surface, and a see-through mirror that reflects the image light emitted from the prism mirror toward a pupil position, wherein the prism mirror and the see-through mirror are disposed so that an optical path is folded along a reference surface to form an off-axis optical system, an intermediate image is formed between the inner reflection surface and the see-through mirror, and a wedge-shaped prism disposed between the prism mirror and the see-through mirror is included.

An optical unit according to a specific aspect includes a projection lens that transmits image light from an image element, a prism mirror that receives the image light emitted from the projection lens through a light incident surface, reflects the image light with an inner reflection surface, and emits the image light from a light emission surface, and a see-through mirror that reflects the image light emitted from the prism mirror toward a pupil position, wherein the prism mirror and the see-through mirror are disposed so that an optical path is folded along a reference surface to form an off-axis optical system, an intermediate image is formed between the inner reflection surface and the see-through mirror, and a refraction surface having a region having a relatively high refractive power on a front side and a region having a relatively low refractive power on a rear side is included between the inner reflection surface and the see-through mirror, with respect to the reference surface.

What is claimed is:

1. A display device comprising:
an image element that emits an image light;
a projection lens that transmits the image light from the image element;
a prism that includes:
a light incident surface in which the image light from the projection lens is incident,
a light emission surface emitting the image light, and
a reflecting surface reflecting the image light from the light incident surface toward the light emission surface; and
a mirror that reflects a part of the image light from the prism toward a pupil position and that transmits other part of the image light,
wherein
an intermediate image is formed between the reflection surface and the mirror, and
the light emission surface has a first region and a second region that is higher a refractive power than the first region, wherein an inflection point is provided between the first region and the second region.

2. The display device according to claim 1, wherein the second region has a positive refractive power, and the first region has a negative refractive power.

3. The display device according to claim 1, wherein the region having the high refractive power and the region having the low refractive power have positive refractive power.

4. The display device according to claim 1, wherein the prism has a recess having an obtuse angle at a boundary between the light incident surface and the light emission surface in a cross section along a reference surface.

5. The display device according to claim 4, wherein the reference surface extends in an up-down direction.

6. The display device according to claim 5, wherein an optical path from the image element to the prism is disposed above an upper end of the mirror.

7. The display device according to claim 5, wherein a width of the prism in a transverse direction perpendicular to the reference surface is greater than a width thereof in a forward and rearward direction parallel to the reference surface.

8. The display device according to claim 1, wherein the image element corrects distortion generated by the projection lens, the prism, and the mirror.

9. An optical unit comprising:
a projection lens that transmits an image light;
a prism that includes:
a light incident surface in which the image light form the projection lens,
a light emission surface emitting the image light, and
a reflecting surface reflecting the image light from the light incident surface to the light emission surface; and
a mirror that reflects a part of the image light emitted from the prism toward a pupil position that transmits other part of the image light,
wherein
an intermediate image is formed between the reflection surface and the mirror, and the light emission surface has a first region and a second region that is higher a refractive power than the first region, wherein an inflection point is provided between the first region and the second region.

10. A display device comprising:
an image element that emits an image light;
a projection lens that transmits the image light from the image element;
a prism that includes:
a light incident surface in which the image light from the projection lens is incident,
a light emission surface emitting the image light, and
a reflecting surface reflecting the image light from the light incident surface toward the light emission surface; and
a mirror that reflects a part of the image light from the prism toward a pupil position and that transmits other part of the image light,
wherein
an intermediate image is formed between the reflection surface and the mirror, and
the light emission surface has a first region and a second region that is higher a refractive power than the first region, wherein the second region has a positive refractive power, and the first region has a negative refractive power.

* * * * *